United States Patent [19]
Robitaille et al.

[11] Patent Number: 5,747,973
[45] Date of Patent: May 5, 1998

[54] CURRENT REGULATING SWITCH CIRCUIT

[75] Inventors: James M. Robitaille; Robert L. Crevling, Jr.; Mark E. Baer, all of Williamsport, Pa.

[73] Assignee: Shop Vac Corporation, Williamsport, Pa.

[21] Appl. No.: 763,805

[22] Filed: Dec. 11, 1996

[51] Int. Cl.⁶ .................. G05F 1/10; H02J 1/00
[52] U.S. Cl. .............................. 323/239; 307/39
[58] Field of Search ..................... 323/237, 239, 323/266, 267, 908; 307/12, 32, 36, 38, 39

[56]  References Cited

U.S. PATENT DOCUMENTS

| | | | |
|---|---|---|---|
| 3,077,542 | 2/1963 | Daugherty | 307/34 |
| 3,205,420 | 9/1965 | Cobb | 318/99 |
| 3,416,001 | 12/1968 | Fistell | 307/38 |
| 3,517,217 | 6/1970 | Sleater et al. | 307/252 |
| 3,551,775 | 12/1970 | Safluddin | 318/434 |
| 3,566,198 | 2/1971 | Delahunty | 317/33 |
| 3,579,706 | 5/1971 | Hetland | 15/327 |
| 3,588,943 | 6/1971 | Hetland | 15/327 |
| 3,603,817 | 9/1971 | Casson | 307/252 B |
| 3,608,988 | 9/1971 | Amberg | 312/223 |
| 3,614,533 | 10/1971 | Douglas et al. | 317/18 D |
| 3,668,602 | 6/1972 | Griffin | 339/14 R |
| 3,740,585 | 6/1973 | Squiers | 307/252 B |
| 3,781,604 | 12/1973 | Scarpino | 315/312 |
| 3,790,810 | 2/1974 | Rogers et al. | 307/66 |
| 3,818,314 | 6/1974 | Bishop et al. | 321/45 R |
| 3,872,371 | 3/1975 | Williams | 321/16 |
| 3,943,564 | 3/1976 | Tushinsky | 360/55 |
| 4,010,336 | 3/1977 | Trevithick | 200/51 R |
| 4,021,879 | 5/1977 | Brigham | 15/319 |
| 4,051,425 | 9/1977 | Smith | 363/86 |
| 4,055,740 | 10/1977 | Nakamura et al. | 219/10.49 R |
| 4,055,793 | 10/1977 | Bartlett | 323/22 SC |
| 4,070,586 | 1/1978 | Breslin | 307/22 |
| 4,117,537 | 9/1978 | Muench | 364/492 |
| 4,228,364 | 10/1980 | Walden | 307/38 |
| 4,245,319 | 1/1981 | Hedges | 364/493 |
| 4,325,045 | 4/1982 | Mehl | 336/197 |
| 4,328,459 | 5/1982 | McLeod, Jr. | 323/300 |
| 4,336,462 | 6/1982 | Hedges et al. | 307/35 |
| 4,336,626 | 6/1982 | Hone et al. | 15/319 |
| 4,357,729 | 11/1982 | Vander Molen et al. | 15/319 |

(List continued on next page.)

FOREIGN PATENT DOCUMENTS

| | | |
|---|---|---|
| 0 777 996 A2 | 6/1997 | European Pat. Off. .......... A47L 9/28 |
| 2748174 A1 | 5/1979 | Germany . |
| 3303126 C2 | 8/1984 | Germany . |
| 3433352 A1 | 3/1986 | Germany . |
| 3621212 A1 | 1/1987 | Germany . |
| 3710619 A1 | 10/1988 | Germany . |
| 63-191580 | 8/1988 | Japan . |

OTHER PUBLICATIONS

Electrostar brochure for Starmix vacuum cleaner dated Oct., 1983, and entitled "Sägen, Bohren, Schleifen . . . und Absaugen—jetzt in einem Arbeitsgang".

(List continued on next page.)

Primary Examiner—Matthew V. Nguyen
Attorney, Agent, or Firm—Marshall, O'Toole, Gerstein, Murray & Borun

[57] ABSTRACT

A regulating switch circuit for conditioning operation of a first load upon operation of a second load wherein the first load and the second load consume electrical energy from a power source includes a detecting means for detecting the operation of the second load and a sensing means for sensing an amount a parameter of the electrical energy supplied to at least one of the first and second loads exceeds a predetermined level. A load control device couples at least one of the first and second loads to the power source wherein the load control device has a control terminal. A control circuit is coupled to the control terminal of the load control device and is responsive to the sensing means and the detecting means to variably adjust the electrical energy supplied by the power source to at least one of the first and second loads to limit the parameter of the electrical energy to the predetermined level.

26 Claims, 3 Drawing Sheets

U.S. PATENT DOCUMENTS

| | | | |
|---|---|---|---|
| 4,373,761 | 2/1983 | Hansberry, Jr. | 312/250 |
| 4,465,966 | 8/1984 | Long et al. | 323/248 |
| 4,471,232 | 9/1984 | Peddie et al. | 307/35 |
| 4,485,341 | 11/1984 | Welty et al. | 323/315 |
| 4,569,567 | 2/1986 | Zucchini | 339/154 A |
| 4,580,080 | 4/1986 | Smith | 315/199 |
| 4,659,941 | 4/1987 | Quiros et al. | 307/11 |
| 4,663,948 | 5/1987 | Rummel | 68/12 R |
| 4,667,262 | 5/1987 | Maier | 361/42 |
| 4,675,537 | 6/1987 | Mione | 307/38 |
| 4,697,136 | 9/1987 | Ishikawa | 323/267 |
| 4,731,549 | 3/1988 | Hiddleson | 307/125 |
| 4,755,691 | 7/1988 | Bethea | 307/114 |
| 4,761,705 | 8/1988 | Reeves et al. | 361/93 |
| 4,801,376 | 1/1989 | Kulitz | 210/123 |
| 4,970,623 | 11/1990 | Pintar | 361/187 |
| 4,977,638 | 12/1990 | Best | 15/301 |
| 5,005,470 | 4/1991 | Denker | 98/115.3 |
| 5,047,597 | 9/1991 | Jailor | 200/5 B |
| 5,095,579 | 3/1992 | Becker | 15/339 |
| 5,099,157 | 3/1992 | Meyer | 307/632 |
| 5,099,544 | 3/1992 | Yamamoto | 15/339 |
| 5,120,983 | 6/1992 | Samann | 307/38 |
| 5,208,940 | 5/1993 | London et al. | 15/345 |
| 5,229,908 | 7/1993 | Gurstein et al. | 361/85 |
| 5,256,906 | 10/1993 | Tsuge et al. | 307/39 |
| 5,436,511 | 7/1995 | Nigawara et al. | 307/39 |

OTHER PUBLICATIONS

Goblin Limited "Aqua Vac" product range catalogue dated Mar., 1992.

Goblin Limited "Aqua Vac" service data sheet for Synchro 820 Series device dated Mar., 1992.

Goblin Limited "Aqua Vac" brochure for Synchro 30A and 40AC devices.

Robert Bosch GmbH service manual apparently dated Sep., 1985.

General Electric SRC Manual, 5th Ed., pp. 256–261 (1972).

Motorola, Semiconductor Master Selection Guide, Rev. 3, Ch. 5, p. 138 (1989).

Teccor Electronics, Inc. General Catalog, pp. 134, 139, 140, and 181.

E.K. Howell, "Triac Control For AC Power," May 1964, pp. 1–7.

John E. Mungenast, "AC Motor Speed Control," Aug. 1964, pp. 13–16.

J.H. Galloway, "Using The Triac for Control of AC Power," Mar. 1966.

1
CURRENT REGULATING SWITCH CIRCUIT

TECHNICAL FIELD

The present invention relates generally to current control circuits and, more particularly, to such circuits which may be used to control current consumption of a vacuum cleaner when used in conjunction with a power tool.

BACKGROUND ART

It is often desirable when operating two motors simultaneously to provide for the automatic activation (or deactivation) of one of the motors, referred to as the secondary load, in response to the activation (or deactivation) of the other motor, referred to as the primary load. For example, operation of a vacuum cleaner could be conditioned upon the operation of a power tool. In this way, the vacuum cleaner could be automatically activated to collect particulate matter generated by the power tool. Such coordinated activation and deactivation of the primary load and the secondary load has been provided by control switch circuits (see, e.g., Sämann U.S. Pat. No. 5,120,983) which generally include a current sensor to detect current flowing to the primary load. The current sensor, in turn, drives a triac or other switching element disposed between the power supply and the secondary load to permit current flow thereto.

In systems having two loads that may be operated concurrently, it may also be desirable to limit the current supplied to one or both of the loads to avoid exceeding a safe level of current for the power supply or power lines connecting the power supply to the two loads. Vander Molen U.S. Pat. No. 4,357,729 discloses a vacuum cleaner having a controller for reducing the current supplied to a suction motor when the suction motor and a brush motor are operated concurrently. However, in the event the brush motor is replaced by a motor drawing a different magnitude of current, the amount of current reduction could only be manually modified through user adjustment of the resistance of a variable resistor.

SUMMARY OF THE INVENTION

According to one aspect of the present invention, a regulating switch circuit for conditioning operation of a first load upon operation of a second load wherein the first load and the second load consume electrical energy from a power source comprises a detecting means for detecting the operation of the second load and a sensing means for sensing an amount a parameter of the electrical energy supplied to at least one of the first and second loads exceeds a predetermined value. The regulating switch circuit further comprises a load control device coupling at least one of the first and second loads to the power source, wherein the load control device has a control terminal. The regulating switch circuit still further comprises a control circuit coupled to the control terminal of the load control device. The control circuit is responsive to the sensing means and the detecting means to variably adjust the electrical energy supplied by the power source to at least one of the first and second loads to limit the parameter of the electrical energy to the predetermined level.

In a preferred embodiment, the sensing means develops a correction signal having a voltage magnitude representative of the amount the parameter of the electrical energy exceeds the predetermined level. The sensing means may comprise a current transformer disposed between the power source and the first and second loads such that the parameter of electrical energy sensed is a total magnitude of current drawn from the power source. The load control device may comprise a triac which couples the first load to the power source in accordance with a duty cycle of the triac. The control terminal of the load control device may be a gate terminal of the triac.

2

The first load may be a vacuum motor for a vacuum cleaner device having a power outlet for coupling the second load to the power source, wherein the second load may be a power tool. In addition, the regulating switch circuit may include a switch coupled to the power outlet and the vacuum motor which has a first position wherein the vacuum motor operates independently of the power tool and the power tool is not activated, a second position wherein the operation of the vacuum motor is conditioned upon the operation of the power tool, and a third position wherein neither the vacuum motor nor the power tool is activated. The regulating switch circuit may also include a further triac having a gate terminal coupled to the switch to supply current to the gate terminal of the first-named triac when the switch is in the first position.

In the preferred embodiment, the control circuit includes a transistor having a base electrode coupled to the sensing means wherein the transistor is conductive to an extent determined by the voltage magnitude of the correction signal such that the control circuit variably adjusts the duty cycle of the first-named triac to limit the total magnitude of current drawn from the power source. The control circuit may also include an optoisolator having first and second portions wherein the second portion is coupled to the gate terminal of the first-named triac, a unijunction transistor coupled to the first portion of the optoisolator, and a diode coupling a collector electrode of the transistor to an emitter electrode of the unijunction transistor. Further, a capacitor may be coupled to the emitter electrode of the unijunction transistor.

The sensing means preferably includes an amplifying means, a converting means coupled to the amplifying means, and a comparing means. The detecting means may include a further current transformer and a rectifier coupled to the further current transformer. The detecting means may further include a filter/amplifier circuit coupled to the rectifier, a comparator circuit coupled to the filter/amplifier circuit, and a further transistor connected in parallel with the first-named transistor, wherein the further transistor has a base electrode responsive to a signal developed by the comparator circuit to enable the control circuit.

According to another aspect of the present invention, a regulating switch circuit for conditioning operation of a first load upon operation of a second load wherein the first load and the second load draw a total magnitude of current from a power source comprises a detecting means for detecting the operation of the second load and a developing means for developing a correction signal wherein the correction signal has a voltage magnitude representative of an amount the total magnitude of current exceeds a predetermined level. The regulating switch circuit further comprises a switching device coupling the first load to the power source in accordance with a duty cycle of the switching device, wherein the switching device has a control terminal. The regulating switch circuit may further comprise a phase control circuit coupled to the control terminal of the switching device wherein the phase control circuit is responsive to the correction signal and the detecting means to variably adjust the duty cycle of the switching device to limit the total magnitude of current to a predetermined level.

According to yet another aspect of the present invention, a regulating switch circuit for conditioning operation of a first load upon operation of a second load wherein the first load and the second load draw a total magnitude of current from a power source comprises a triac coupling the first load to the power source in accordance with a duty cycle of the triac. The regulating switch circuit further comprises a first current sensor disposed between the power source and the first and second loads wherein the first current sensor generates a signal representative of the total magnitude of current, a second current sensor coupling the second load to the power source, a summer coupled to the first current sensor, and a phase control circuit responsive to both the summer and the second current sensor for variably adjusting the duty cycle of the triac to an extent necessary to limit the total magnitude of current to a predetermined level.

DESCRIPTION OF THE PREFERRED EMBODIMENT

Figure 1:
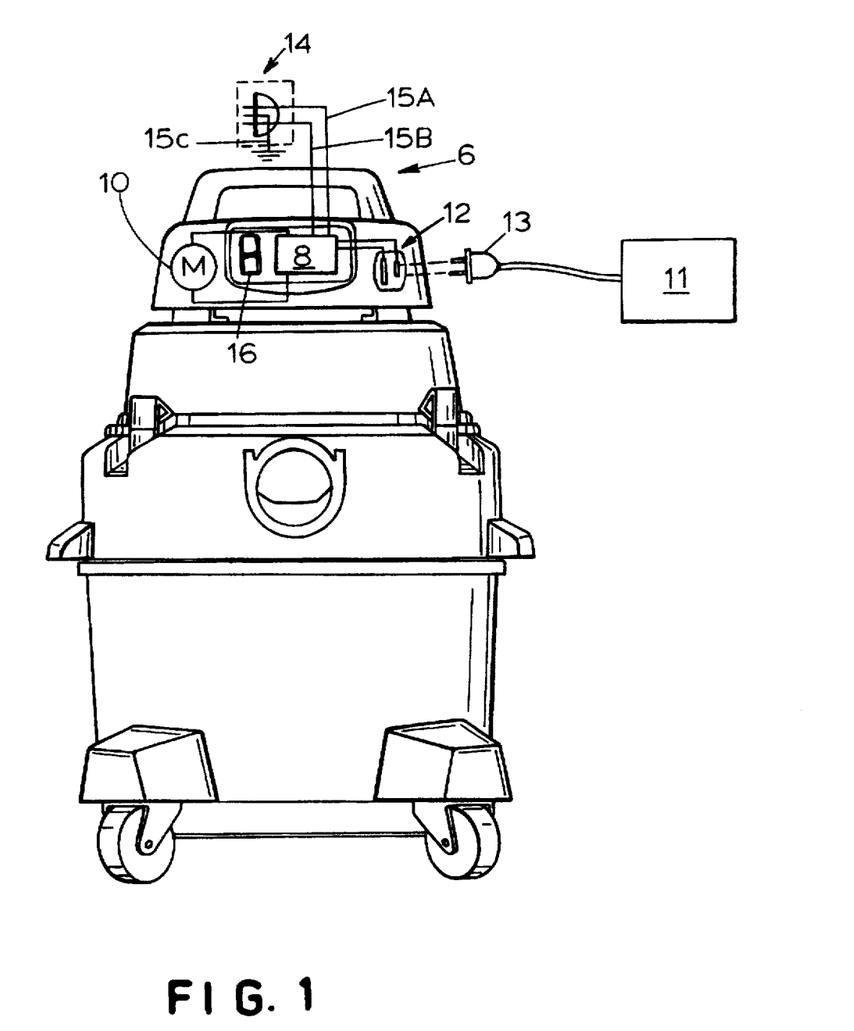
FIG. 1 is a diagrammatic view of a power tool together with an elevational view of a vacuum cleaner having a current regulating switch circuit incorporating the present invention.

Referring now to FIG. 1, a vacuum cleaner 6 includes a current regulating switch circuit 8 coupled to a vacuum motor 10. The vacuum motor 10 provides suction useful for collecting particulate matter generated by a power tool 11. The power tool 11 is attached to the vacuum cleaner 6 at a power tool outlet 12 which, in turn, is coupled to the current regulating switch circuit 8. The power tool 11 includes a male plug 13 disposed at an end of a power cord for engaging the power tool outlet 12. The vacuum motor 10 and the power tool 11 receive power from a power source 14 coupled to the current regulating switch circuit 8 by a high voltage line 15A and a low voltage line 15B. The power source 14 has a terminal tied to ground by a line 15C. The power source 14 preferably provides AC power at 115 Volts rms across the high and low voltage lines 15A and 15B.

Figure 2:
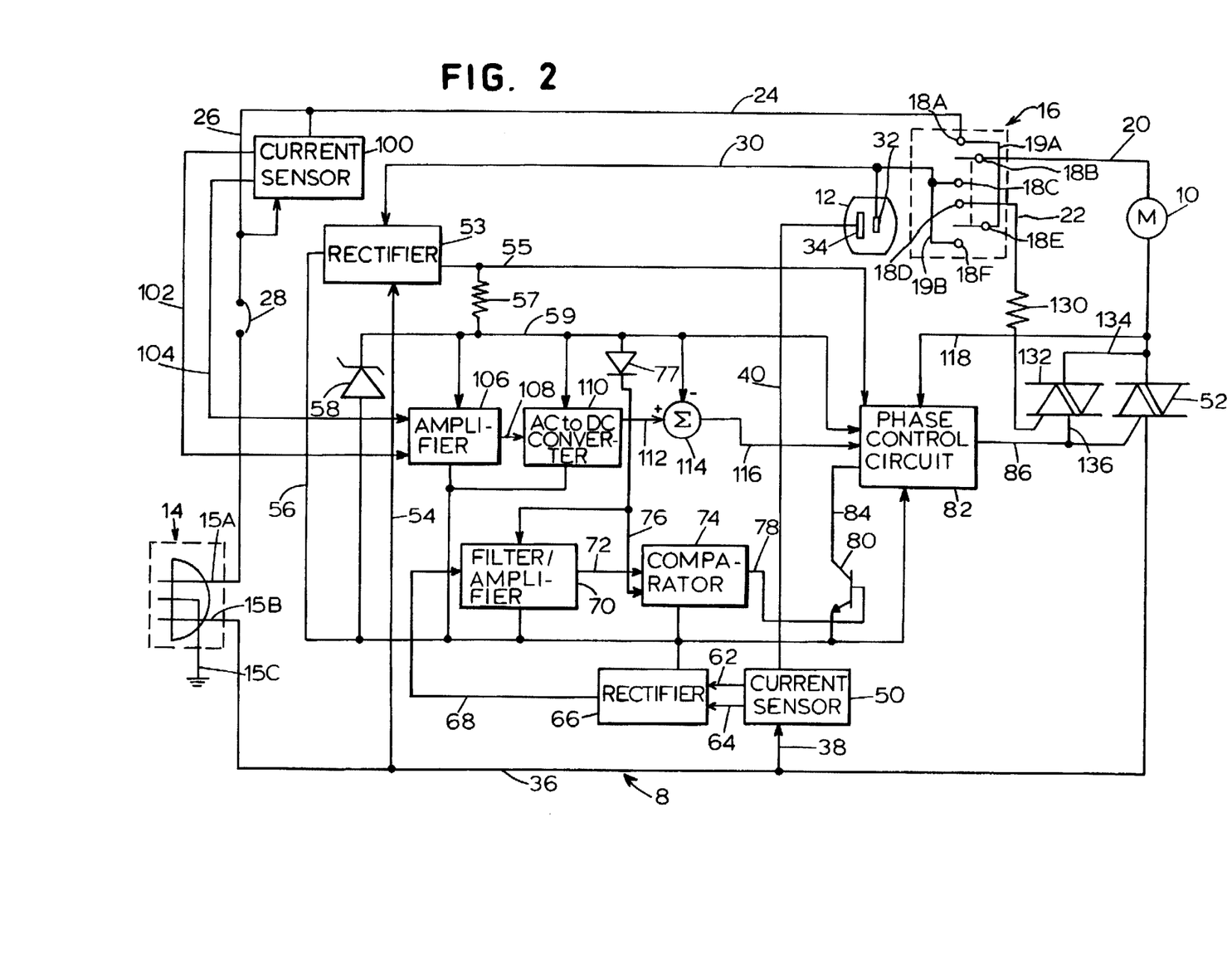
FIG. 2 is a simplified block diagram of the current regulating switch circuit of FIG. 1.
Figure 3:
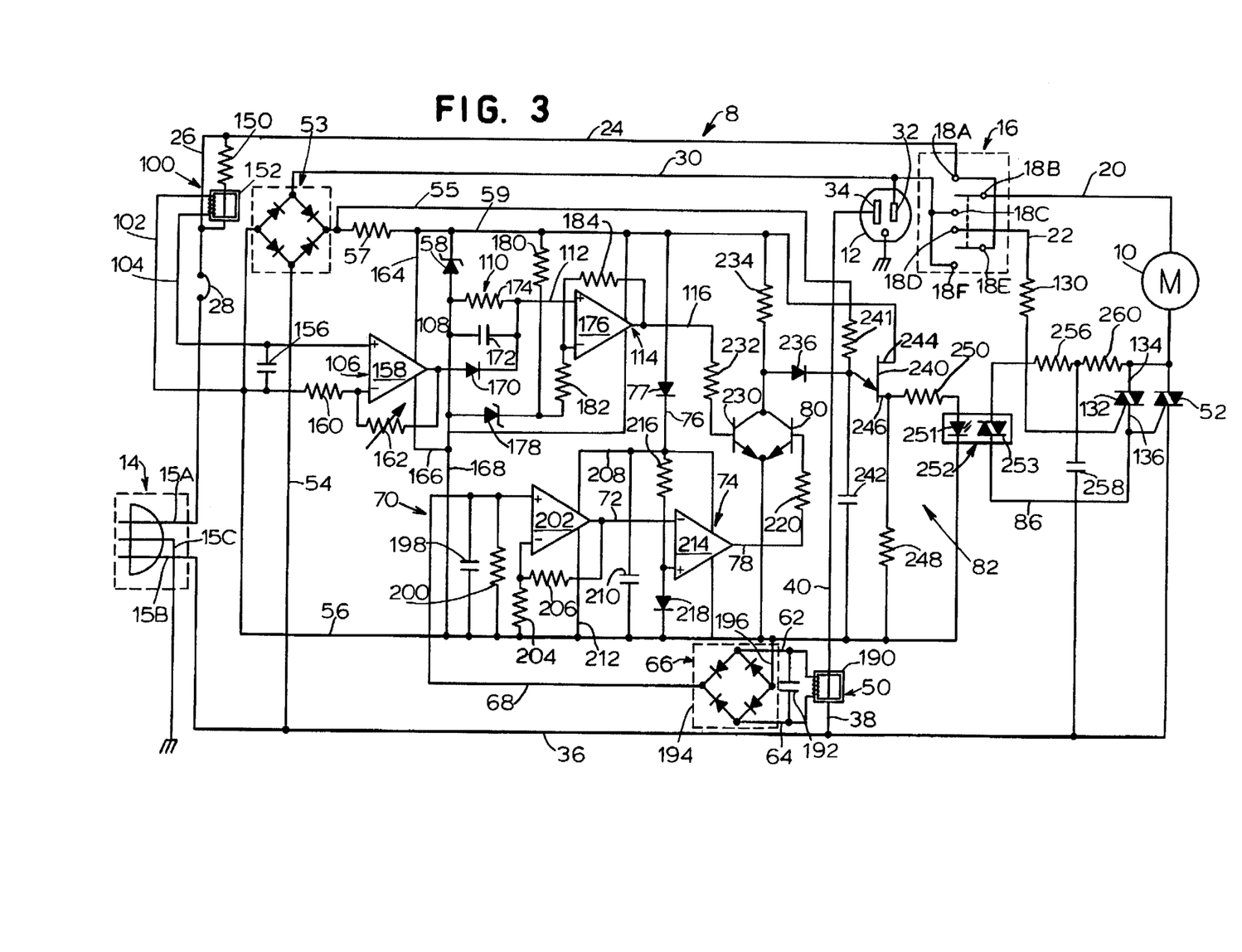
FIG. 3 is a schematic diagram of a preferred embodiment of the current regulating switch circuit of FIG. 2.

Referring now to FIGS. 2 and 3, a preferred embodiment of the current regulating switch circuit 8 includes a three-position rocker switch 16 which couples both the vacuum motor 10 and the power tool outlet 12 to the power source 14. The three-position rocker switch 16 has first through sixth switch terminals (or contacts) 18A–18F. The switch terminals 18A and 18E are connected by a line 19A within the three-position rocker switch 16, while the switch terminals 18C and 18F are connected by a similar line 19B.

The three positions of the rocker switch 16 are a VAC ONLY (or ON) position, an AUTO position and an OFF position. When the three-position rocker switch 16 is in the OFF position, the switch terminals 18A–18F are as shown in FIGS. 2 and 3 (i.e., the switch terminals 18A and 18E are out of contact with the switch terminals 18B, 18C, 18D and 18F). When the three-position rocker switch 16 is moved to the VAC ONLY position, the switch terminals 18B and 18E are moved into contact with the switch terminals 18A and 18D such that lines 20 and 22 are coupled to a line 24. The line 24, in turn, is coupled to the high voltage line 15A of the power source 14 by a line 26 and a circuit breaker 28. Thus, when the three-position switch 16 is in the VAC ONLY position, a first terminal of the vacuum motor 10 is coupled to the high voltage line 15A of the power source 14.

When the three-position rocker switch 16 is moved to the AUTO position, the switch terminals 18B and 18E are moved into contact with the switch terminals 18C and 18F such that the line 20 and a line 30 are connected to the line 24. As a result, a first terminal 32 of the power tool outlet 12 is also coupled to the high voltage line 15A of the power source 14. Thus, when the three-position rocker switch 16 is in the AUTO position, both the power tool 11 and the vacuum cleaner 6 are coupled to the high voltage line 15A of the power source 14.

Alternatively, the three-position rocker switch 16 may be replaced by a conventional two-position switch (not shown) providing only two modes of operation, OFF and AUTO. Such an embodiment may be desirable when the vacuum cleaner 6 would always be operated in conjunction with the power tool 11.

The low voltage line 15B of the power source 14 is coupled to a second terminal 34 of the power tool outlet 12 by lines 36, 38, and 40, and a tool current sensor 50. The line 36 is also connected to a first main terminal of a triac 52. A second main terminal of the triac 52 is coupled to a second terminal of the vacuum motor 10.

Referring now solely to FIG. 2 and assuming the three-position rocker switch 16 is in the AUTO position, the line 30 couples the high voltage line 15A of the power source 14 to a rectifier circuit 53. The rectifier circuit 53 is additionally coupled to the low voltage line 15B of the power source 14 by a line 54. The rectifier circuit 53 develops a 110 Volt pulsating DC power voltage across lines 55 and 56. This voltage is preferably lowered by a dropping resistor 57 and clamped to a 20 Volt level across lines 59 and 56 by a zener diode 58. The 20 Volt pulsating DC power voltage across the lines 59 and 56 powers most of the circuit components in the current regulating switch circuit 8. As a result, such circuit components are isolated from the power source 14 by the rectifier circuit 53, but in such a way as to permit the synchronization of the output signals of such circuit components to the AC power waveform of the power source 14.

With continued reference to FIG. 2, the tool current sensor 50 detects current flowing in the line 38 from the power source 14 to the power tool 11 through the power tool outlet 12. An AC signal representative of the tool current is developed by the current sensor 50 across lines 62 and 64, and a rectifier circuit 66 produces a rectified signal representative of the tool current on a line 68. The rectified tool current signal on the line 68 is provided to a filter/amplifier circuit 70 which develops an amplified DC signal representative of the tool current on a line 72. A comparator circuit 74 compares the amplified DC signal on the line 72 to a reference signal developed on a line 76. Both the filter/amplifier circuit 70 and the comparator circuit 74 are coupled to the 20 Volt pulsating DC power voltage by a diode 77 and the line 76.

The comparator circuit 74 develops an output signal on a line 78 which is, in turn, provided to a base electrode of an NPN transistor 80. A collector electrode of the NPN transistor 80 is coupled to a phase control circuit 82 by a line 84. The phase control circuit 82 develops an output signal on a line 86 connected to a gate (or control) terminal of the triac 52.

In operation, the current sensor 50, the rectifier 66, the filter/amplifier circuit 70, the comparator circuit 74 and the NPN transistor 80 collectively perform a conditional switching function of the present invention. Initially, if there is little or no tool current, the DC signal developed by the filter/amplifier circuit 70 causes the output signal of the comparator circuit 74 to assume a high DC voltage level derived from the 20 Volt pulsating DC voltage. This high DC output signal renders the NPN transistor 80 conductive and, thus, pulls the voltage at the collector electrode of the NPN transistor 80 down to a low voltage magnitude substantially equal to a neutral reference voltage on the line 56. As noted in greater detail hereinafter, this low voltage magnitude disables the phase control circuit 82 from firing the triac 52. When the triac 52 is not fired, no current is supplied to the vacuum motor 10 and, thus, the vacuum cleaner 6 is not activated.

Once the power tool 11 is activated, the DC signal developed by the filter/amplifier circuit 70 assumes a sufficiently high voltage level to cause the output signal of the comparator circuit 74 to drop to the neutral reference voltage on the line 56. In the preferred embodiment, the tool current need only reach a threshold magnitude of approximately 125–250 milliamps (rms) in order to switch the output signal of the comparator circuit 74. The neutral reference voltage provided to the NPN transistor 80 renders the latter nonconductive, thereby enabling the phase control circuit 82. The phase control circuit 82, when enabled, develops a control signal to rapidly fire (or turn on) the triac 52 during each half-cycle of the AC waveform in a manner which delivers a controllably variable level of current to the vacuum motor 10. In this way, the activation of the vacuum cleaner 6 (i.e., the secondary load) is conditioned upon the activation of the power tool 11 (i.e., the primary load).

Both the filter/amplifier circuit 70 and the comparator circuit 74 provide gain to decrease the tool current magnitude threshold necessary to enable the phase control circuit 82. Lowering the tool current magnitude threshold translates into a shorter time lag between the activation of the power tool 11 and the activation of the vacuum motor 10. In the event that a short time lag is not necessary or perhaps undesirable, the gain provided by the filter/amplifier circuit 70 and the comparator circuit 74 may no longer be necessary. Accordingly, the current regulating switch circuit 8 can be simplified by the removal of the entire comparator circuit 74 and any amplifying components (to be discussed in detail hereinafter) of the filter/amplifier circuit 70.

With continued reference to FIG. 2, the total current flowing from the power source 14 through the line 24 is detected by a current sensor 100. The current sensor 100 and the inherent resistance in the line 26 form a current divider to allow the current sensor 100 to develop a signal representative of the total current magnitude across lines 102 and 104. The lines 102 and 104 couple the current sensor 100 to an amplifier 106 and thence to an AC-to-DC converter 110 which develops a varying DC level signal on a line 112 representative of the total current magnitude. A summer 114 compares the varying DC level signal to a fixed reference voltage derived from the 20 Volt pulsating DC power voltage on the line 59 (i.e., the summer 114 calculates a difference between the two aforementioned signals).

The summer 114 develops a correction signal on a line 116 representative of an amount by which the total current magnitude exceeds a predetermined safe level, such as 12 amps. The correction signal is preferably representative in a proportional sense but may, however, represent the amount in any other fashion known to those skilled in the art. The phase control circuit 82 is responsive to the correction signal for development of a firing control signal for the triac 52. When the total current magnitude is less than or equal to the predetermined magnitude, the phase control circuit 82 renders the triac 52 continuously conductive so that the vacuum motor 10 receives the full AC power voltage across the lines 24 and 36 and thus rotates at rated (or full) speed. When the total current magnitude exceeds the predetermined magnitude, the phase control circuit 82 retards or delays the firing (or turn-on) point of the triac 52 in each half-cycle of the AC waveform developed across the lines 24 and 36 to reduce the effective voltage applied to the vacuum motor 10 by an amount dependent upon the magnitude of the correction signal on the line 116. The reduction in effective voltage applied to the vacuum motor 10 causes the latter to slow down, and thus draw a lower magnitude of current from the power source 14. Eventually, the vacuum motor 10 will drop to a certain reduced speed, thereby causing the current magnitude drawn by the vacuum motor 10 to reduce to a point at which the total current magnitude equals the predetermined magnitude. The vacuum motor 10 thereafter continues to run at the certain reduced speed.

As the foregoing discussion demonstrates, the phase control circuit 82 adjusts the duty cycle of the triac 52 in dependence upon the correction signal appearing on the line 116.

If the three-position rocker switch 16 is moved to the VAC ONLY (or ON) position, current flows through the three-position rocker switch 16 from the power source 14 to the line 22 and thence through a current-limiting resistor 130 to a gate terminal of an additional triac 132. As a result, the triac 132 is fired at the beginning of each half-cycle of the AC power waveform developed by the power source 14. The triac 132, in turn, fires the triac 52 at the beginning of each half-cycle to permit continuous current flow from the power source 14 to the vacuum motor 10 to operate the latter at full speed.

While the three-position rocker switch 16 is in the VAC ONLY (or ON) position, neither the switch terminal 18C nor the switch terminal 18F is coupled to the power source 14, thereby disconnecting the power tool outlet 12 and the rectifier circuit 53 from the power source 14.

Referring now to FIG. 3, a preferred embodiment of the current regulating switch circuit 8 of the present invention is shown in detail (elements common to both FIGS. 2 and 3 have been assigned like reference numerals). The current sensor 100 preferably includes a current limiting resistor 150 and a current transformer 152 having a ferrite core and a 1000-to-1 turns ratio. The current transformer 152 is connected in the current divider as shown in FIGS. 2 and 3 because the full current in the line 26 would saturate the current transformer 152 and, thus, prohibit an accurate measurement of the total current magnitude.

The current sensor 100 could alternatively be simplified to include a single resistor such that the total current magnitude (or, equivalently, the total power drawn) would be measured as a voltage drop across the single resistor. Further modifications, however, may be necessary in such an alternative embodiment to isolate components of the current regulating switch circuit 8 from the power source 14.

With continued reference to FIG. 3, a capacitor 156 may be connected across the lines 102 and 104 to remove noise prior to amplification by the amplifier 106. The amplifier 106 preferably includes an op-amp 158, a resistor 160 and a variable resistor 162. The op-amp 158 has a power terminal coupled by a line 164 to the 20 Volt pulsating DC power voltage on the line 59. The op-amp 158 further has a neutral reference terminal coupled by lines 166 and 168 to the neutral reference voltage on the line 56.

The AC-to-DC converter 110 preferably includes a diode 170, a capacitor 172 and a resistor 174 connected in a conventional fashion. The summer 114 preferably includes an op-amp 176 provided on a single IC chip with the op-amp 158. As a result, the op-amp 176 is also powered by the 20

Volt pulsating DC voltage on the line 59 which, in turn, causes the correction signal on the line 116 to have a pulsating DC nature. The summer 114 further includes a 5.6 Volt zener diode 178 and resistors 180, 182, and 184 for developing the fixed reference voltage and comparing it to the varying DC level signal representative of the total current magnitude.

To fine-tune the development of the correction signal, the variable resistor 162 of the amplifier 106 is adjusted to a resistance to set the correction signal to zero amplitude when the total current magnitude equals the predetermined safe magnitude.

The gain provided by the op-amps 158 and 176 constitutes an efficient method for developing the correction voltage with sufficient resolution to smoothly vary the total current drawn by the vacuum motor 10. Alternative embodiments could employ a digital signal processor or other digital processor, as is well known to those skilled in the art. However, to achieve a similar amount of resolution, such alternative digital embodiments may be undesirably expensive.

With continued reference to FIG. 3, the rectifier circuit 53 is preferably of the full-wave type. Other circuits known to those skilled in the art could alternatively be used to rectify the AC power waveform to develop the pulsating DC power voltage on the lines 55 and 59.

The tool current sensor 50 preferably includes a current transformer 190 similar in construction to the current transformer 152. Noise in the tool current signal developed by the current transformer 190 is filtered out by a capacitor 192 prior to provision to the rectifier circuit 66, which is preferably of the full-wave or an equivalent type.

The filter/amplifier circuit 70 preferably includes a capacitor 198 and a resistor 200 coupled in parallel between the line 68 and the neutral reference voltage on the line 56. The filter/amplifier circuit 70 further includes an op-amp 202 and resistors 204 and 206. The op-amp 202 has a power terminal coupled by a line 208 to the line 76. The line 208 is further coupled to the neutral reference voltage on the line 56 by a capacitor 210. The op-amp 202 also has a neutral reference terminal coupled by a line 212 to the neutral reference voltage on the line 56.

The comparator circuit 74 preferably includes the capacitor 210, an op-amp 214 (preferably packaged on the same IC chip with the op-amp 202), a resistor 216, and a diode 218. The capacitor 210 and the diode 77 filter out the AC component of the 20 Volt pulsating DC power voltage on the line 59 to develop a DC voltage on the lines 76 and 208. The resistor 216 limits current flow through the diode 218 which, in turn, sets the fixed reference voltage utilized by the comparator circuit 74 to a DC voltage equal to the forward-bias voltage of the diode 218.

The op-amps 202 and 214 are powered by the DC voltage on the line 208 and the neutral voltage on the line 56. Thus, as generally described hereinabove, the output signal of the comparator circuit 74 approximately assumes either (1) the high DC voltage on the line 208, or (2) the neutral reference voltage (because the absence of feedback for the op-amp 214 usually drives the output signal of the comparator circuit 74 to either rail of the op-amp 214).

With continued reference to FIG. 3, a resistor 220 limits the current supplied by the op-amp 214 to the base electrode of the NPN transistor 80. The NPN transistor 80 is connected to an additional NPN transistor 230 of the phase control circuit 82 in a common emitter configuration. The NPN transistor 230 has a base electrode coupled by a resistor 232 to the summer 114. The NPN transistors 80 and 230 have respective collector electrodes connected together. The respective collector electrodes of the NPN transistors 80 and 230 are coupled to the 20 Volt pulsating DC power voltage on the line 59 by a resistor 234.

The phase control circuit 82 further includes a diode 236 and a unijunction transistor (UJT) 240 having an emitter electrode coupled by a resistor 241 to the 110 Volt pulsating DC power voltage on the line 55. The emitter electrode of the UJT 240 is also coupled to the neutral reference voltage on the line 56 by a capacitor 242. The UJT 240 also has first and second base electrodes 244 and 246, respectively. The first base electrode 244 of the UJT 240 is coupled to the 20 Volt pulsating DC power voltage on the line 59, while the second base electrode 246 of the UJT 240 is coupled by a resistor 248 to the neutral reference voltage on the line 56.

The phase control circuit 82 further includes a resistor 250 coupling the second base electrode 246 of the UJT 240 to a light-emitting diode (LED) portion 251 of an optoisolator circuit 252. The optoisolator circuit 252 also includes a light-sensitive triac portion 253. The phase control circuit 82 still further includes a resistor 256, a capacitor 258 and a resistor 260.

In operation, the phase control circuit 82 is enabled as long as the NPN transistor 80 is nonconductive (i. e., the tool current is more than 125 milliamps rms). However, the phase control circuit 82 will also remain enabled for a period of time (about 7-9 seconds if the tool current is at least 3 amps rms) after the power tool 11 is deactivated due to the time required for the capacitor 198 to discharge. While the phase control circuit 82 is enabled, the voltage at the common collector node of the NPN transistors 80 and 230 is dependent upon the magnitude of the correction signal. If the correction signal magnitude is sufficiently high to cause the NPN transistor 230 to conduct, the voltage of the common collector terminal is pulled down a certain extent toward the neutral reference voltage which, in turn, does not allow a certain amount of current to flow through the diode 236 to charge the capacitor 242.

If the correction signal is not high enough to render the NPN transistor 230 conductive, the voltage at the common collector node stays approximately at the 20 Volt pulsating DC power voltage (minus the voltage drop across the resistor 234), providing current to charge the capacitor 242. Hence, the response of the NPN transistor 230 to the magnitude of the correction signal effectively modifies the charging rate of an RC circuit formed by the resistors 234 and 241 and the capacitor 242.

The diode 236 provides a bias for the emitter electrode of the UJT 240 which causes the latter to conduct over a gently sloping range of voltages across the capacitor 242. This, in turn, causes the relationship between the duty cycle of the triac 52 and the correction signal magnitude to be substantially linear. In other words, the diode 236 allows the phase control circuit 82 to smoothly vary the triac firing angle from 0° to 180°.

Once the voltage across the capacitor 242 ramps up from the bias provided by the diode 236 and reaches a triggering level of the UJT 240, the UJT 240 fires, discharging the capacitor 242 and sending current through the LED portion 251 of the optoisolator circuit 252. In response, the light-sensitive triac portion 253 of the optoisolator circuit 252 allows current to flow through the resistors 256 and 260 to provide current to the gate terminal of the triac 52, which thereby fires the triac 52. The resistor 256 is provided to limit the current provided to the light-sensitive triac portion 253 of the optoisolator circuit 252.

Thus, the time at which the charge collected by the capacitor 242 fires the UJT 240 determines the point in each half-cycle that the triac 52 is fired to allow current to flow through the vacuum motor 10.

With a highly inductive load such as the vacuum motor 10, a snubber circuit composed of the capacitor 258 and the resistor 260 is preferably provided to reduce the rate of rise of the voltage across the main terminals of the triac 52. This ensures that the triac 52 accurately fires in response to the firing signal provided by the optoisolator circuit 252.

Preferably, the above-identified components have the following values, it being understood the values are exemplary only and may vary from those shown and still embody the present invention:

| | |
|---|---|
| Resistor 57 | 6.8 kΩ |
| Resistor 130 | 20.0 kΩ |
| Resistor 150 | .100 Ω |
| Capacitor 156 | 6.80 μF |
| Resistor 160 | 24.0 kΩ |
| Variable Resistor 162 | 500 kΩ (maximum) |
| Capacitor 172 | 100 μF |
| Resistor 174 | 47.0 kΩ |
| Resistor 180 | 15.0 kΩ |
| Resistor 182 | 18.0 kΩ |
| Resistor 184 | 24.0 kΩ |
| Capacitor 192 | 1.00 μF |
| Capacitor 198 | 6.80 μF |
| Resistor 200 | 220 kΩ |
| Resistor 204 | 24.0 kΩ |
| Resistor 206 | 390 kΩ |
| Capacitor 210 | 47.0 μF |
| Resistor 216 | 15.0 kΩ |
| Resistor 220 | 180 kΩ |
| Resistor 232 | 390 kΩ |
| Resistor 234 | 5.10 kΩ |
| Resistor 241 | 1.10 MΩ |
| Capacitor 242 | .100 μF |
| Resistor 248 | 150 Ω |
| Resistor 250 | 150 Ω |
| Resistor 256 | 150 Ω |
| Capacitor 258 | .470 μF |
| Resistor 260 | 4.70 Ω |

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which are within the scope of the appended claims, is reserved.

We claim:

1. A regulating switch circuit for conditioning operation of a first load upon operation of a second load wherein the first load and the second load consume electrical energy from a power source, the regulating switch circuit comprising:

means for detecting the operation of the second load;

means for sensing an amount that a parameter of the electrical energy supplied to at least one of the first and second loads exceeds a predetermined level;

a load control device coupling at least one of the first and second loads to the power source, wherein the load control device has a control terminal; and a control circuit coupled to the control terminal of the load control device and responsive to the sensing means and the detecting means to variably adjust the electrical energy supplied by the power source to at least one of the first and second loads to limit the parameter of the electrical energy to the predetermined level.

2. The regulating switch circuit of claim 1, wherein the sensing means comprises means for developing a correction signal having a voltage magnitude representative of the amount the parameter of the electrical energy exceeds the predetermined level.

3. The regulating switch circuit of claim 2, wherein the sensing means further comprises a current transformer disposed between the power source and the first and second loads such that the parameter of electrical energy sensed is a total magnitude of current drawn from the power source.

4. The regulating switch circuit of claim 3, wherein:

the load control device comprises a triac which couples the first load to the power source in accordance with a duty cycle of the triac; and the control terminal of the load control device comprises a gate terminal of the triac.

5. The regulating switch circuit of claim 4, wherein:

the first load is a vacuum motor for a vacuum cleaner device having a power outlet for coupling the second load to the power source wherein the second load is a power tool;

a switch coupled to the power outlet and the vacuum motor having a first position wherein the vacuum motor operates independently of the power tool and the power tool is not activated, a second position wherein the operation of the vacuum motor is conditioned upon the operation of the power tool, and a third position wherein neither the vacuum motor nor the power tool is activated; and a further triac having a gate terminal coupled to the switch to supply current to the gate terminal of the first-named triac when the switch is in the first position.

6. The regulating switch circuit of claim 5, wherein the control circuit comprises a transistor having a base electrode coupled to the correction signal developing means wherein the transistor is conductive to an extent determined by the voltage magnitude of the correction signal such that the control circuit variably adjusts the duty cycle of the first-named triac to limit the total magnitude of current drawn from the power source.

7. The regulating switch circuit of claim 6, wherein the control circuit further comprises:

an optoisolator having first and second portions wherein the second portion is coupled to the gate terminal of the first-named triac;

a unijunction transistor coupled to the first portion of the optoisolator wherein the unijunction transistor has an emitter electrode;

a diode coupling a collector electrode of the transistor to the emitter electrode of the unijunction transistor; and a capacitor coupled to the emitter electrode of the unijunction transistor.

8. The regulating switch circuit of claim 7, wherein the sensing means further comprises:

means for amplifying the signal representative of the total magnitude of current to develop an amplified signal; and means coupled to the amplifying means for converting the amplified signal to a varying DC signal;

wherein the correction signal developing means comprises means for comparing the varying DC signal with a fixed reference signal.

9. The regulating switch circuit of claim 8, wherein the detecting means includes:
- a further current transformer for developing a signal representative of a magnitude of current flowing from the power source to the power tool; and
- a rectifier coupled to the further current transformer to develop a rectified signal representative of the magnitude of current flowing from the power source to the power tool.

10. The regulating switch of claim 9, wherein the detecting means further includes:
- a filter/amplifier circuit coupled to the rectifier to develop an amplified DC signal representative of the magnitude of current flowing from the power source to the power tool;
- a comparator circuit for comparing the amplified DC signal with a further fixed reference signal; and
- a further transistor connected in parallel with the first-named transistor, wherein the further transistor has a base electrode coupled to the comparator circuit and is responsive to a signal developed thereby to enable the control circuit.

11. A regulating switch circuit for conditioning operation of a first load upon operation of a second load wherein the first and second loads draw a total magnitude of current from a power source, the regulating switch circuit comprising:
- means for detecting the operation of the second load;
- means for developing a correction signal having a voltage magnitude representative of an amount that the total magnitude of current exceeds a predetermined level;
- a switching device coupling the first load to the power source in accordance with a duty cycle of the switching device, wherein the switching device has a control terminal; and
- a phase control circuit coupled to the control terminal of the switching device and responsive to the correction signal and the detecting means to variably adjust the duty cycle of the switching device to limit the total magnitude of current to the predetermined level.

12. The regulating switch circuit of claim 11, wherein the developing means comprises:
- a current transformer for developing a signal representative of the total magnitude of current;
- an amplifier responsive to the signal representative of the total magnitude of current to develop an amplified signal representative of the total magnitude of current;
- an AC-to-DC converter coupled to the amplifier to develop a varying DC signal representative of the total magnitude of current; and
- a summer responsive to the varying DC signal and a reference signal for developing the correction signal.

13. The regulating switch circuit of claim 12, wherein the amplifier and the summer comprise first and second op-amp circuits, respectively.

14. The regulating switch circuit of claim 13, wherein the first op-amp circuit includes a variable resistor disposed in a feedback path for fine-tuning the developing means to zero the correction signal when the total magnitude of current equals the predetermined level.

15. The regulating switch circuit of claim 14, wherein the phase control circuit includes:
- an optoisolator having an input portion and an output portion wherein the output portion is coupled to the control terminal of the switching device;
- a transistor having a collector electrode and a base electrode coupled to the developing means such that the transistor is conductive to an extent determined by the voltage magnitude of the correction signal;
- a unijunction transistor coupled to the input portion of the optoisolator, wherein the unijunction transistor has an emitter electrode;
- a diode coupling the collector electrode of the transistor to the emitter electrode of the unijunction transistor; and
- a capacitor coupled to the emitter electrode of the unijunction transistor.

16. The regulating switch circuit of claim 15, wherein the detecting means includes:
- a further current transformer for developing a signal representative of a magnitude of current flowing from the power source to the second load;
- a rectifier coupled to the further current transformer to develop a rectified signal representative of the magnitude of current flowing from the power source to the second load;
- a third op-amp circuit coupled to the rectifier to develop an amplified and rectified signal;
- a fourth op-amp circuit coupled to the third op-amp circuit to compare the amplified and rectified signal with a fixed reference signal; and
- a further transistor connected in parallel with the first-named transistor, wherein the further transistor has a base electrode coupled to the fourth op-amp circuit and is responsive to a signal developed thereby to enable the phase control circuit.

17. The regulating switch circuit of claim 16, wherein the switching device is a triac and the control terminal of the switching device is a gate terminal of the triac.

18. The regulating switch circuit of claim 11, wherein the first load is a vacuum motor for a vacuum cleaner having a power outlet for powering the second load and wherein the second load is a power tool.

19. A regulating switch circuit for conditioning operation of a first load upon operation of a second load wherein the first and second loads draw a total magnitude of current from a power source, the regulating switch circuit comprising:
- a triac coupling the first load to the power source to an extent determined by a duty cycle of the triac;
- a first current sensor disposed between the power source and the first and second loads wherein the first current sensor generates a signal representative of the total magnitude of current;
- a second current sensor coupling the second load to the power source;
- a summer coupled to the first current sensor;
- a phase control circuit responsive to both the summer and the second current sensor for variably adjusting the duty cycle of the triac to an extent necessary to limit the total magnitude of current to a predetermined level.

20. The regulating switch circuit of claim 19, wherein:
- the summer develops a correction signal having a voltage magnitude; and
- the phase control circuit includes a transistor having a base electrode coupled to the summer such that the transistor is conductive to an extent determined by the voltage magnitude of the correction signal.

21. The regulating switch circuit of claim 20, further comprising:
- an outlet for coupling the second load to the power source;
- a switch coupled to the outlet and the first load having a first position wherein the first load operates independently of the second load and the second load is not activated, a second position wherein operation of the first load is conditioned upon operation of the second load, and a third position wherein neither of the first and second loads is activated.

22. The regulating switch circuit of claim 21, further comprising:

a rectifier coupled to the switch for developing pulsating DC power for the second current sensor, the summer, and the phase control circuit when the switch is in the second position; and an optoisolator coupling the output of the phase control circuit to a gate terminal of the triac, wherein the rectifier and the optoisolator isolate the second current sensor, the summer and the phase control circuit from the power source but allow the phase control circuit to be synchronized with the power source.

23. The regulating switch circuit of claim 22, further comprising:

a further triac having a gate terminal coupled to the switch to supply current to the gate terminal of the first-named triac when the switch is in the first position.

24. The regulating switch circuit of claim 23, wherein the second current sensor further includes:

a current transformer coupling the second load to the power source;

a further rectifier coupled to the current transformer;

an amplifier circuit coupled to the further rectifier;

a comparator circuit coupled to the amplifier circuit; and a further transistor connected in parallel with the first-named transistor, wherein the further transistor is responsive to a signal developed by the comparator circuit to enable the phase control circuit.

25. The regulating switch circuit of claim 24, wherein the phase control circuit further includes:

a unijunction transistor coupled to the gate terminal of the first-named triac by the optoisolator;

a diode coupling a collector of the first-named transistor to an emitter electrode of the unijunction transistor; and a capacitor coupled to the emitter electrode of the unijunction transistor.

26. The regulating switch circuit of claim 25, wherein the summer is coupled to the first current sensor by a further amplifier circuit and an AC-to-DC converter.

* * * * *